April 28, 1936. P. H. HUTCHINSON 2,039,223
CUTTING OR SURFACING MACHINE
Filed April 15, 1930
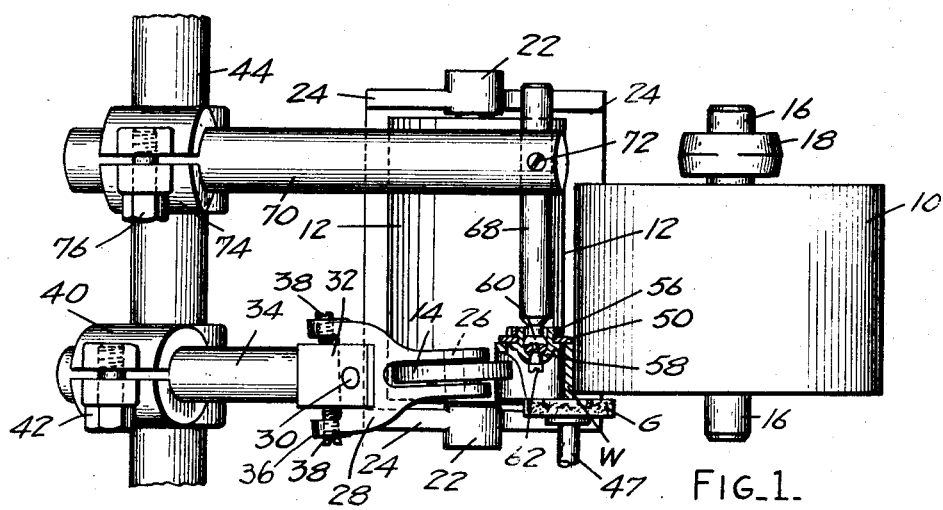
FIG_1_
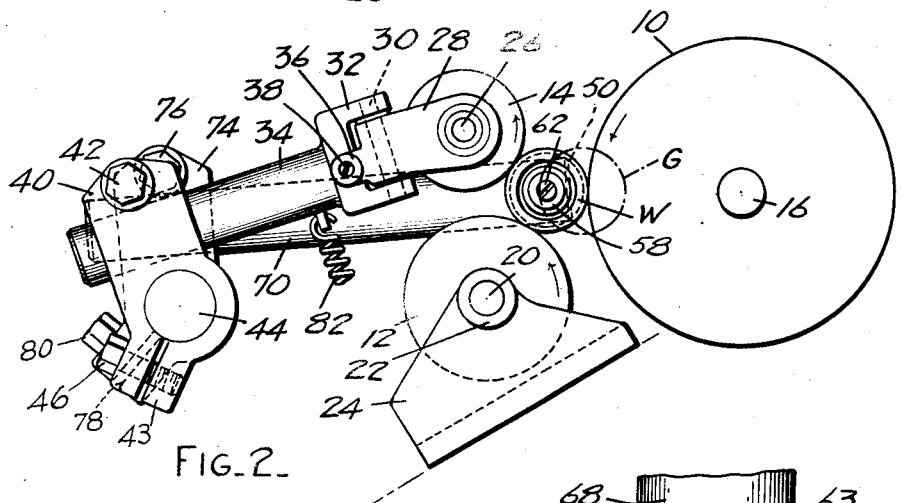
FIG_2_
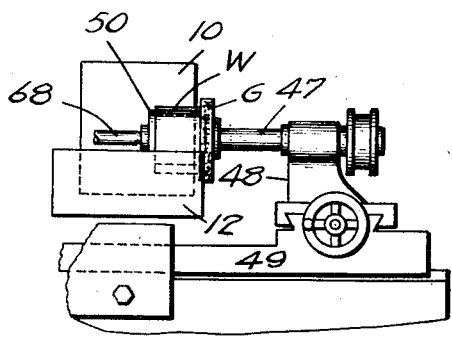
FIG_3_
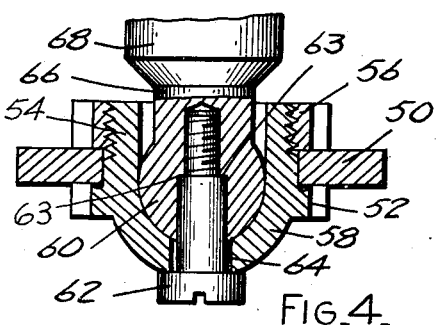
FIG_4_
INVENTOR_
PHILIP H. HUTCHINSON_
BY
Gales P. Moore
HIS ATTORNEY_

Patented Apr. 28, 1936

2,039,223

UNITED STATES PATENT OFFICE 2,039,223

CUTTING OR SURFACING MACHINE

Philip H. Hutchinson, Montclair, N. J., assignor to General Motors Corporation, Detroit, Mich., a corporation of Delaware Application April 15, 1930, Serial No. 444,542

16 Claims. (Cl. 51—129)

This invention relates to cutting or surfacing machines and comprises all the features and aspects of novelty herein disclosed. An object of the invention is to provide a precision cutting machine for producing a surface exactly square with the axis of a work-piece or otherwise receding uniformly from the axis. Another object is to provide improved mechanism for supporting and rotating a work-piece for a cutting operation. Another object is to provide an improved method of squaring an end face or shoulder on a round work-piece.

To these ends and to improve generally and in detail upon machines and methods of this character, the invention also consists in the various matters hereinafter described and claimed. In its broader aspects, the invention is not necessarily limited to the specific details selected for illustration in the accompanying drawing in which Fig. 1 is a plan view with certain frame parts omitted.

Fig. 2 is a side view of Fig. 1.

Fig. 3 is a front view to smaller scale and with some parts omitted.

Fig. 4 is a sectional view, enlarged, of the wabble plate and mounting.

This invention is especially designed for precision cutting operations on sleeves, rolls or other work-pieces for producing a surface or face which is flat and exactly perpendicular to the axis. Hitherto, so far as I am aware, no machine has hitherto been capable of effecting such an operation with precision or dispatch. In the illustrative example, the piece to be squared is supported and rotated by a series of rollers which maintain the axis of the piece in a definite line while a grinding wheel having a face perpendicular to that line is presented to one end face of the piece, axial shifting of the piece being prevented by a wabble plate engaging an opposite end face of the piece to compensate for any out-of-square condition of such face.

The letter W indicates a work-piece, herein shown as a cylindrical sleeve supported for rotation at a controlled speed by rollers 10, 12, and 14. The roller 10 is desirably the control or driving roller and has its shaft 16 mounted in any suitable bearings for rotation, as by a belt pulley 18. The roller 12 is a supporting roller and is preferably an idler, its shaft 20 being journalled in bearings 22 of a slide 24. The axes of the shafts 20 and 16 lie in the same plane (which may be inclined) and when the engaging surfaces of the work and rollers are cylindrical, these axes are also parallel. The work-piece has rolling line contact with both rollers, the roller 12 holding the work-piece in such a position that the axis of rotation remains in a definite and established line which is in the same plane with the line of contact of roller 10. The slide 24 is inclined with respect to the plane containing the axis of the work-piece and the axis of the roller 10 for convenience in adjusting the roller 12 to suit the diameter of the work and so support all work-pieces at the same level.

The weight of the work-piece W tends to hold it in running position but to insure effective control of rotation by the driving roller 10, the third roller 14 is held against the work yieldingly and so presses the work against the other wheels. This roller can also have its axis tilted a little to produce a tendency of the work to creep or feed endwise against an abutment as will appear. In the illustrated construction, the roller 14 has its shaft 26 journalled for rotation in a yoke 28 which is swivelled on a pivot 30 connecting upper and lower lugs of a fork 32 formed at the end of a swingable arm 34. The yoke 28 has side lugs 36 spaced from the base of the fork 32 and tapped to receive adjusting screws 38. By this means the roller 14 can be skewed around the pivot pin 30 as indicated in Fig. 1, thereby tending to move the work-piece axially during rotation. The arm 34 is adjustable endwise in a split clamping member 40 having a clamp bolt 42. This adjustment is to locate the roller 14 in accordance with the diameter of the work-piece, the arm being shortened when the slide 24 is lowered for larger work and the three rollers thereby maintaining approximately the same angular spacing around work-pieces of any selected diameter. The clamping member also has a split portion 43 clamped to a rock shaft 44 by clamp bolt 46. The rock shaft is journalled in any suitable way to have its axis parallel to the work. Adjustment of the clamping member along the shaft provides for location of the roller 14 to suit the length of the work, it being preferable but not essential to have the roller engage the work substantially centrally.

In the present machine, the cutting tool is shown as a cupped grinding wheel G whose operative face is flat to engage an end face of the work. The grinding wheel has its shaft 47 journalled on a cross slide 48 of a table 49 which slides in a direction parallel to the axis of the work, the grinding face thereby operating in a plane which is perpendicular to said axis. For grinding a co-axial face at a uniform angle to the axis, the grinding wheel would be angled to correspond. It is desirable to have the work-piece project beyond one or more of the rollers so that a grinding wheel large enough to overlap the end of the roller can be used. It is apparent that the wheel will produce a flat face precisely square with the axis of the work-piece as long as the piece has no axial shifting, the rollers meanwhile holding the axis of the work-piece in a definite line parallel to the wheel axis. An abutment plate 50 prevents such axial shifting and it is mounted to wabble to compensate for any out-of-square condition in the end face of the piece. For instance, a piece having its end face inclined and engaging a non-shiftable abutment would shift axially during rotation and the opposite face could not be squared.

The abutment plate 50 is herein shown as a flat-sided ring removably held against a flange 52 of a threaded holder 54 by a nut 56. The plate or ring bears flatwise against an end face of the work-piece and is of such selected external diameter as to clear the rollers. The holder has a globular portion 58 which is internally hardened to rotate on a hardened ball 60 which provides a universal or wabbling support for the holder. The holder is retained against casual removal from the ball by a headed screw 62 which clears the globular portion 58, the screw being shouldered at 63 and passing through a lost motion hole 64 in the holder. The ball 60 is connected by a necked-down portion 66 to a supporting rod 68 which is arranged to locate the center of curvature of the ball in the axis of the work-piece. The flange 52 is also so placed on the holder that the work-engaging face of the abutment plate 50 lies in a plane intersecting the center of curvature of the ball. Whether the end face of the work-piece is square across the axis or inclined, the wabble plate always conforms to it and has co-axial rotation therewith while preventing the slightest axial shifting of the work. The work-engaging face is preferably continuous in order to bear at a plurality of points around the circumference of the work, the better to avoid any tilting tendency due to heavy tool pressure. The work and the abutment plate have separate supports but there is no frictional rubbing of one on the other. The skewed roller 14 produces a creeping tendency to make the work press axially against the wabble plate where it is correctly located for operation by the advancing grinding wheel.

The supporting rod 68 is clamped in a hole of an arm 70 by a set-screw 72, longitudinal adjustment of the supporting rod thereby adapting the wabble plate for work of any selected length. The arm 70 is also adjustable longitudinally in a clamping member 74 which is split and provided with a clamping bolt 76. This adjustment is to locate the center of the supporting rod 68 and ball 60 in the axis of the work whatever the diameter. The clamping member has another split portion 78 held by a clamping bolt 80 to the rock shaft 44. To make room for inserting a work-piece W, the roller 14 is lifted by its swingable arm 34, a suitable spring 82 restoring the roller to pressure position. The wabble plate and tool above described are especially adapted to square a plain sleeve. Suitable modification can be made to square internal or external flanges on a body of revolution or to square a solid piece. The wabbling abutment so compensates for any out-of-square condition in the engaging face of the piece that the piece is not shifted axially. Hence at any given diameter of face or flange, whether the latter is straight or slanting, all points are equidistant from the center of wabbling (or from any other selected point in the axis of the piece) and so are in a plane which is square with the axis. The machine is also adapted for internal grinding, a small grinding wheel entering the bore and having a cross feeding movement with the usual slide 48 to carry the cutting point along a radius of the roller 10.

I claim:

1. In a precision machine for cutting a flat face square with the axis of a work-piece, a cutting tool operating in a plane extending square across the axis of the work-piece, an abutment plate engaging an end face of the work-piece opposite to the cutting tool, and means for supporting said plate for wabbling motion to compensate for out-of-square condition of said end face of the work-piece; substantially as described.

2. In a precision machine for cutting a flat face square with the axis of a work-piece, means for rotating the work-piece and maintaining its axis of rotation in a definite line, a cutting tool for engaging the surface to be squared, an abutment member for preventing axial shifting of the work-piece, and means providing a wabbling support for the abutment member; substantially as described.

3. In a precision machine for cutting a flat face square with the axis of a work-piece, means for rotating the work-piece and maintaining its axis of rotation in a definite line, a cutting tool for engaging the surface to be squared, an abutment member engaging the work-piece to prevent axial shifting thereof, and means for supporting the abutment member for rotation with the work-piece and for wabbling movement in accordance with any out-of-square condition in the surface of the work-piece engaged by said member; substantially as described.

4. In a precision machine for cutting a flat face square with the axis of a work-piece, means for rotating the work-piece and maintaining its axis of rotation in a definite line, a cutting tool for engaging the surface to be squared, an abutment member engaging the work-piece to prevent axial shifting thereof, and a universal support for said abutment member; substantially as described.

5. In a precision machine for cutting a flat face square with the axis of a work-piece, means for rotating the work-piece and maintaining its axis of rotation in a definite line, a cutting tool for engaging the surface to be squared, an abutment member engaging the work-piece to prevent axial shifting thereof, a universal support providing for oscillation of the abutment member, and means for locating the center of oscillation in the axis of rotation of the work-piece; substantially as described.

6. In a precision machine for cutting a flat face square with the axis of a work-piece, means for rotating the work-piece and maintaining its axis of rotation in a definite line, a cutting tool for engaging the surface to be squared, an abutment member engaging an end face of the work-piece to prevent axial shifting thereof, and means providing for a wabble motion of the abutment member around a center in the plane of said end face of the work-piece; substantially as described.

7. In a precision machine for cutting a flat face square with the axis of a work-piece, means for rotating the work-piece and maintaining its axis of rotation in a definite line, a grinding wheel having a cutting face operating in a plane extending square across the axis of the work-piece, and a wabble plate engaging that end of the work-piece which is opposite to the grinding wheel; substantially as described.

8. In a precision machine for cutting a flat face square with the axis of a round work-piece, rollers having rolling line contact with the work-piece for rotating the work-piece and maintaining its axis of rotation in a definite line, a cutting tool engaging the surface to be squared, an abutment member for preventing axial shifting of the work-piece, and means providing a wabbling support for the abutment member to compensate for out-of-square condition in the face of the work-piece engaged by said member; substantially as described.

9. In a precision machine for cutting a flat face square with the axis of a round work-piece, rollers having rolling line contact with the work-piece for rotating the work-piece and maintaining its axis of rotation in a definite line, a cutting tool engaging the surface to be squared, an abutment member engaging the work-piece for preventing axial shifting thereof, and a support for the abutment member providing for rotation of the abutment member and for a wabbling motion thereof; substantially as described.

10. In a precision machine for cutting a flat face square with the axis of a round work-piece, a control roller having rolling line contact with the work-piece to control rotation thereof, means for maintaining the axis of the work-piece in a plane with said line of contact, a cutting tool for engaging the surface to be squared, and a wabble plate engaging the work-piece to prevent axial shifting thereof; substantially as described.

11. In a machine of the character described, means for rotating a round work-piece and maintaining its axis of rotation in a definite line, a cutting tool engaging an end face of the work-piece, and a wabble plate engaging the work-piece to prevent axial shifting thereof; substantially as described.

12. In a machine of the character described, means for rotating a round work-piece and maintaining its axis of rotation in a definite line, a cutting tool engaging an end face of the work-piece, a wabble plate engaging the work-piece to prevent axial shifting thereof, and means for adjusting the wabble plate with respect to the tool to suit the length of the work-piece; substantially as described.

13. In a machine for precision squaring of an end face of a round work-piece, work supporting and positioning means for peripheral engagement with the work-piece, an abutment engaging one end face of the work-piece, a grinding wheel having a flat abrading face perpendicular to the axis of the work-piece and extending across a face of the work-piece in opposition to the abutment, means for urging the work-piece against the abutment and away from the grinding wheel, and means for mounting the abutment to rotate by frictional contact with the work-piece, said mounting means also being constructed and arranged to support the abutment for a wabbling movement; substantially as described.

14. In a precision machine for cutting a face on a round work-piece at a predetermined angle to the axis thereof, means for rotating the piece and maintaining its axis of rotation in a definite line, a cutting tool having a cutting surface operating at said predetermined angle to the axis of the piece, an abutment member engaging the piece in opposition to the tool to prevent axial shifting of the piece, and means for supporting the abutment member for universal movement to compensate for any out-of-square condition in the surface of the piece engaged by the abutment member; substantially as described.

15. In a precision machine for producing a face at a predetermined angle to the axis of a round work-piece, rollers engaging the work-piece and rotatably supporting it in a floating manner by rolling contact with the periphery thereof, a work-altering tool having an operative portion arranged at said predetermined angle to the axis of the work-piece, and a wabbling abutment engaging the work-piece and opposing the pressure of the tool; substantially as described.

16. In a machine of the character described, means for rotating a round work-piece and maintaining its axis of rotation in a definite line, a work-altering tool for engaging an end face of the work-piece, a rotary abutment having frictional driving engagement with the work-piece and opposing the pressure of the tool, and means for supporting the rotary abutment for wabbling movement around a center in the axis of the work-piece; substantially as described.

PHILIP H. HUTCHINSON.